(12) United States Patent
Fredriksson et al.

(10) Patent No.: US 10,677,635 B2
(45) Date of Patent: Jun. 9, 2020

(54) DIELECTRIC FILLING MEMBER WITH MICROWAVE ABSORBING ELEMENT

(71) Applicant: Rosemount Tank Radar AB, Mölnlycke (SE)

(72) Inventors: Håkan Fredriksson, Linköping (SE); Peter Elmberg, Mölndal (SE); Magnus Ohlsson, Norsholm (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 225 days.

(21) Appl. No.: 15/798,774

(22) Filed: Oct. 31, 2017

(65) Prior Publication Data

US 2019/0128728 A1 May 2, 2019

(51) Int. Cl.
*G01F 23/284* (2006.01)
*H01Q 13/02* (2006.01)
*H01Q 1/22* (2006.01)
*H01Q 19/08* (2006.01)

(52) U.S. Cl.
CPC .......... *G01F 23/284* (2013.01); *H01Q 1/225* (2013.01); *H01Q 13/02* (2013.01); *H01Q 13/0283* (2013.01); *H01Q 19/08* (2013.01)

(58) Field of Classification Search
CPC .................................................. G01F 23/284
See application file for complete search history.

(56) References Cited

U.S. PATENT DOCUMENTS

| | | | |
|---|---|---|---|
| 6,417,748 B1 * | 7/2002 | Lopatin | B29B 13/065 333/252 |
| 7,864,104 B2 * | 1/2011 | Chen | H01Q 13/02 342/124 |
| 9,476,753 B2 * | 10/2016 | Georgescu | G01S 7/02 |
| 2002/0126061 A1 * | 9/2002 | Griessbaum | G01F 23/284 343/786 |
| 2004/0113853 A1 * | 6/2004 | Serban | G01F 23/284 343/703 |
| 2015/0276460 A1 * | 10/2015 | Georgescu | G01S 7/02 342/124 |
| 2016/0273954 A1 * | 9/2016 | Bergmann | G01F 23/284 |

OTHER PUBLICATIONS

Rubrice, Kevin et al. "Dielectric Characteristics and Microwave Absorption of Graphene Composite Materials", Materials 2016, 9, 825, pp. 1-10 (Year: 2016).*
Notification of Transmittal of the International Search Report and the Written Opinion of the International Searching Authority, or the Declaration from PCT/EP2018/079841, dated Mar. 4, 2019.

* cited by examiner

*Primary Examiner* — Peter M Bythrow
(74) *Attorney, Agent, or Firm* — Westman, Champlin & Koehler, P.A.

(57) ABSTRACT

A radar level gauge including a wave guiding structure and a cavity formed inside the wave guiding structure, and a dielectric filling member arranged at least partly within said cavity. The dielectric filling member includes a main body formed of a polymer material, at least one microwave absorbing element formed of a modified polymer material providing a microwave attenuation of at least 1 dB/centimeter at an operating frequency of the radar level gauge, the modified polymer material being obtained by modifying said polymer material with a filler material, wherein the at least one microwave absorbing element is integrally formed with said main body by sintering.

20 Claims, 6 Drawing Sheets

DIELECTRIC FILLING MEMBER WITH MICROWAVE ABSORBING ELEMENT

FIELD OF THE INVENTION

The present invention relates to a radar level gauge having a wave guiding structure with a dielectric filling member, which filling member includes a microwave absorbing element. The present invention also related to a method for manufacturing such a dielectric filling member.

BACKGROUND OF THE INVENTION

A radar level gauge (RLG) is suitably used for making measurements of a filling level of products such as process fluids, granular compounds and other materials contained in a tank.

An example of such a radar level gauge can include transceiver circuitry for transmitting and receiving microwaves, a signal propagation device arranged to direct microwaves towards the surface and to return microwaves reflected by the surface to the transceiver, and processing circuitry adapted to determine the filling level based on a relation between microwaves transmitted and received by the transceiver.

The signal propagation device may include a wave guiding structure, such as one or several hollow waveguides and a directional antenna, adapted to emit free propagating electromagnetic waves into the tank and receive a reflection of those waves. Such an RLG is sometimes referred to as a non-contact RLG. The antenna may be adapted to a specific frequency band. The currently most used frequency bands have center frequencies of around 6 GHz or 24 GHz, although higher frequency bands may also be contemplated.

In one conventional design the wave guide structure comprises a hollow wave guide which extends through the tank wall, and connects the directional antenna to the transceiver circuitry. A dielectric filling member is sometimes arranged in the cavity of the antenna and/or the wave guide, in order to protect the waveguide/antenna from thermal and chemical influence from the tank atmosphere. The dielectric filling member should be transmissive to microwaves, chemically resistant, preferably hydrophobic (repelling to water), and also needs to withstand temperatures and pressure which are present in the tank. Some applications, known as high-pressure, high temperature (HPHT) applications, present especially challenging conditions. One material which is often used for such filling members is PTFE, also known as Teflon®.

One or several sealing elements, such as O-rings or the like, are typically arranged in groove(s) formed in the plug to provide a process seal ensuring that the contents of the tank are not released into the outside environment. The process seal may be pressure tight. An O-ring, or possibly another type of annular member, may also have the function of mechanically fixating the filling member in the cavity.

There are a few challenges with such dielectric filing members. One potential problem is that suitable materials such as PTFE have large coefficients of thermal expansion, and will expand at elevated temperatures. This may cause stress, deformation and fatigue in the filling member, and eventually fractures. A solution to this problem is to make the filling member slightly smaller than the antenna cavity, so as to leave room for thermal expansion. In order to avoid that the gap formed between the filling member and the inside of the antenna causes interference with the microwave signals, a sleeve of microwave absorbing material may be arranged around the filling member. This is disclosed e.g. in U.S. Pat. No. 7,864,104, where an attenuating foil is fixed to a dielectric filling body with an adhesive film.

Another challenge is that the filing member may cause resonances in the microwave signals. In order to eliminate, or at least reduce, such resonance, it is known to embed an microwave absorbing pin in the filing member. The pin may be made of metal or Eccosorb®, and should be completely concealed in the filling member material so as to not be subject to the tank atmosphere. For example, it is known to insert the pin in a hole extending from the outer face of the filling member, and then glue a PTFE plug in the hole to seal it.

The combination of a dielectric filling body, made e.g. of PTFE, with one or several microwave absorbing elements may be difficult to manufacture in a reliable manner, without introducing additional interfaces, such as adhesive films or glue.

One specific challenge is that some polymers, such as PTFE, are not liquid when melted. This means that such materials cannot be injection molded, and also cannot be welded or otherwise joined by melting.

GENERAL DISCLOSURE OF THE INVENTION

It is an object of the present invention to provide an improved way of combining a dielectric filling member with one or several microwave absorbing elements.

According to a first aspect of the present invention, this and other objects are achieved by a radar level gauge for determining a process variable of a product in a tank using electromagnetic measuring signals, comprising a signal propagation device adapted to direct a microwave transmit signal toward the product and return reflections thereof from a surface of the product, the signal propagation device including a wave guiding structure and a cavity formed inside the wave guiding structure, and a dielectric filling member arranged at least partly within the cavity. The dielectric filling member includes a main body formed of a polymer material, at least one microwave absorbing element formed of a modified polymer material providing a microwave attenuation of at least 1 dB/centimeter at an operating frequency of the radar level gauge, the modified polymer material being obtained by modifying the polymer material with a filler material, wherein the at least one microwave absorbing element is integrally formed with the main body by sintering.

According to a first aspect of the present invention, this and other objects are achieved by a method for manufacturing a dielectric filling member for manufacturing a dielectric filling member for a wave guiding structure of a radar level gauge, including forming a main body of a polymer material, obtaining a modified polymer material by modifying the polymer material with a filler material, the modified polymer material providing a microwave attenuation of at least 1 dB/centimeter at an operating frequency of the radar level gauge, forming at least one microwave absorbing element of the modified polymer material, arranging the at least one microwave absorbing element in pressurized contact with the main body, and heating the main body and the at least one microwave absorbing element to such an extent that the at least one microwave absorbing element is sintered with the main body.

The present invention is based on two important realizations. First of all, microwave absorbing elements may be formed in a modified polymer material, i.e. a polymer material mixed with an appropriate filler material. Such modified polymer materials are known in the art, and are typically obtained by mixing a powder material into a polymer resin (e.g. powder). Secondly, the inventors have realized that such microwave absorbing elements, made of modified polymer, may be integrated into the main body by sintering.

As used herein, the expression "sintering" refers to a process where two elements are integrated by pressing them against each other and heating them without melting. It is known that also polymer materials which are do not have any liquid phase, such as PTFE, may be sintered, although the process is difficult and time consuming. Also, sintering of modified polymer materials, such as modified PTFE, is known per se. However, the present invention is based on the realization that several advantages may be achieved in the specific field of dielectric filling members to be arranged in a horn antenna in a radar level gauge, by using sintering to integrate different parts made of different polymer materials.

More specifically, by sintering a main body of a polymer material (such as PTFE) with one or several microwave absorbing elements made of a modified polymer (such as modified PTFE), a very reliable integration is achieved. The sintering also eliminates the need for adhesives, and fixates the microwave absorbing element(s) without additional interfaces.

The dielectric filling member is made of a dielectric material having suitable electromagnetic properties, in order not to interfere with the operation of the RLG. Further, the material should be hydrophobic, i.e. repel water, and be chemically resistant to the content in the tank, typically petroleum products. Fluoropolymers have been found to have suitable properties, and examples of materials conventionally used as dielectric filling members in radar level gauges include PTFE (polytetrafluoroethylene), PFA (perfluoroalkoxy alkane) and FEP (fluorinated ethylene propylene). These materials have excellent chemical resistance and also have hygienic FDA-approval, i.e. they may be used also in highly hygienic processes, such as in the food industry. Of these, PTFE is the only one that can withstand high temperatures (above 150 degrees C.), and it is therefore often the preferred choice.

It is noted that the polymer material (e.g. PTFE) is not necessarily completely pure (so called "virgin" grade) but may also be mixed with small amounts of other materials in order to provide the most appropriate mechanical properties.

The filler material is chosen to provide the desired microwave attenuation (e.g. at least 1 dB/centimeter), and examples include conductive materials such as metal and magnetic materials such as ferrite. The amount of filler material needs to be sufficient to provide the desired microwave attenuation, but must be small enough to allow sintering of the modified material. As an example, the amount of filer material is greater than 0.5% by weight, or larger than 1% by weight, and less than 15% by weight or less than 10% by weight.

In some embodiments, the wave guiding structure includes a horn antenna having a waveguide section and a horn section, and the cavity is formed inside the waveguide section and the horn section. In this case, the main body may have a substantially cylindrical portion filling the waveguide section, a substantially conical portion filling the horn section, and a convex end portion extending beyond an opening of the horn section. The main body may further include an annular flange for providing sealing between a tank connection of the radar level gauge and a tank flange on which the radar level gauge is intended to be mounted.

However, a dielectric filling member according to the present invention may also be advantageously used only to fill the cavity of a hollow waveguide. Such a hollow wave guide with a dielectric filling member may be connected to a directional antenna, or be connected to some other type of signal propagation device.

The microwave absorbing element(s) may serve to reduce resonance in the microwave signals in the wave guiding structure in which the dielectric member is arranged in. If such a microwave absorber is located inside the process seal, and thus subject to the tank atmosphere, it is advantageous to embed the microwave absorbing element(s) in the main body. One example of such an embedded microwave absorber is a pin arranged in the filling member so as to be located close to the opening of the antenna and aligned with the center axis of the antenna. Such embedded microwave absorbers have previously been made of Eccosorb® or even metal, and sealed behind a polymer plug which is glued in place.

According to an embodiment of the present invention, such a pin can be made of modified polymer, and may be embedded in the main body by forming a hole in the main body extending from an outer surface of the convex end portion, pressing the pin into the hole, forming a plug of polymer material, the plug having a shape to fit tightly in the hole, pressing the plug into said hole to cover the pin, so that, when the main body and the pin are sintered together, the pin is completely concealed in said main body.

With this approach, the surface of the main body will be substantially intact, and not present any glued interfaces. There will also not be any interfaces between the pin and the surrounding polymer, as they have been fully integrated. The performance of the microwave absorbing pin can thus be optimized.

The microwave absorbing element(s) may further serve to avoid interference from a gap between the outside of the filling body and the inside of the wave guiding structure, e.g. an antenna horn. For example, as discussed above, it is known to arrange an attenuating foil around the conical portion of the filling member and fix it with an adhesive.

According to an embodiment of the present invention, such a conical sleeve can be made of modified polymer, pushing the sleeve onto the outside of the conical portion of the filling member. The sleeve can then be integrated with the main body by sintering. With this approach, there is no longer a risk that the absorbing sleeve becomes detached from the dielectric filling member.

The microwave absorbing element(s) will, due to their relatively higher microwave losses, be "invisible" to the microwave signals passing through the horn antenna. This fact may be advantageously used to "hide" such features of the dielectric filling member which otherwise may cause deterioration of the microwave signals. For example, a groove extending around the periphery of the filling member, for receiving a sealing element such as an O-ring, may disturb and attenuate microwave signals passing through the horn antenna.

According to a further embodiment of the present invention, the at least one microwave absorbing element is formed as an annular element with a groove for receiving a sealing element, which is pushed onto the main body. The annular element can then be integrated with the main body by sintering. When the annular element is integrated into the main body, the groove in the annular element of modified polymer will have the same function as a groove formed in the main body of polymer material. However, the annular element and the groove will be "invisible" to microwave signals propagating through the antenna, thereby reducing any disturbance and attenuation.

BRIEF DESCRIPTION OF THE DRAWINGS

The present invention will be described in more detail with reference to the appended drawings, showing currently preferred embodiments of the invention.

FIG. 1a is a schematic view of a radar level gauge according to an embodiment of the present invention, mounted on a tank.

FIG. 1b is a schematic block diagram of some parts of the radar level gauge in FIG. 1a.

DETAILED DESCRIPTION OF PREFERRED EMBODIMENTS

Figures 1A, 1B:
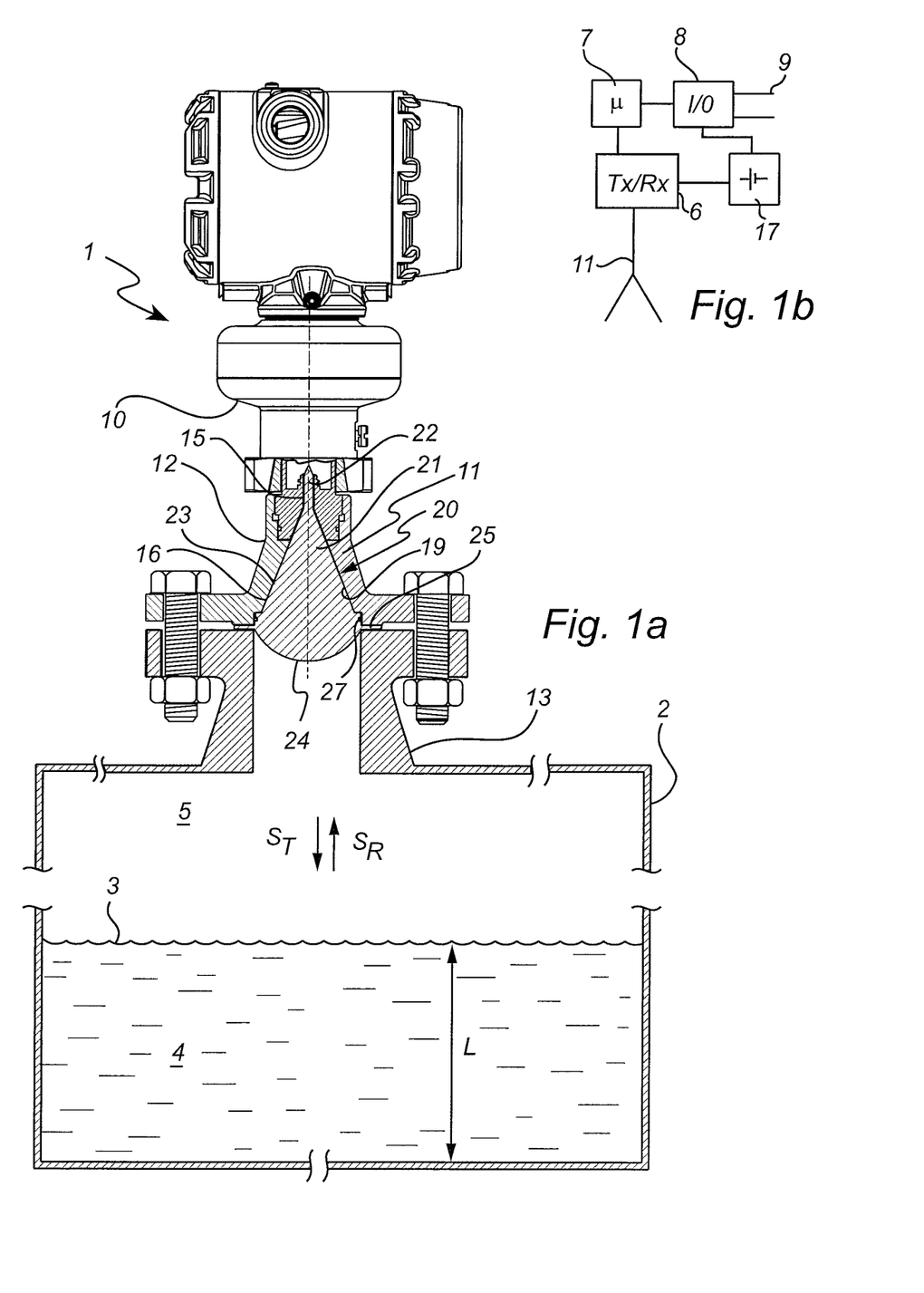

A radar level gauge (RLG) 1 according to an embodiment of the present invention is illustrated schematically in FIGS. 1a and 1b. The RLG 1 is mounted on a tank 2, and arranged to perform measurements of a process variable such as the level L of an interface between two materials in the tank 2. Typically, the first material is a product 4 stored in the tank, e.g. a liquid such as gasoline, or a solid such as a granular compound, the second material is air or other atmosphere 5 in the tank, while the interface is the surface 3 of the product 4. In some applications, the tank is a very large metal tank (diameter in the order of ten meters).

The radar level gauge 1 includes transceiver circuitry 6, processing circuitry 7 and an interface 8, illustrated very schematically in FIG. 1. The RLG circuitry, i.e. the transceiver circuitry 6, processing circuitry 7 and a signal/power circuitry 8, is arranged in a measurement unit (MU) 10 mounted to a tank connection 12 made of a metal material, typically steel, which is adapted to be securely fitted (e.g. bolted or welded) to a tank flange 13. The tank connection 12 is adapted to provide a passage (preferably pressure sealed) for electromagnetic signals through the wall of the tank, which passage connects the transceiver circuitry 6 with a signal propagation device, here a directional antenna in the form of an antenna horn 11 formed by the tank connection 12. The antenna 11 is arranged to act as an adapter, transmitting free propagating electromagnetic waves into the tank 2 to be reflected by the interface, here the surface 3 of the product 4 in the tank 2. An RLG with a directional antenna is often referred to as a non-contact radar (NCR) level gauge.

The antenna 11 comprises a waveguide section 15 and a horn section 16. A coupling arrangement, such as a probe (not shown), is arranged to couple the transmit signal from the transceiver into the waveguide section. The transmit signal will then be allowed to propagate to the horn section and then be emitted into the tank. Conversely, the return signal will be received by the antenna horn section and allowed to propagate through the waveguide section and be coupled back to the transceiver by the coupling arrangement.

A microwave transmissive dielectric filling member 20 is arranged at least partly within the cavity 19 formed by the waveguide section 15 and the horn section 16. The filling member 20 serves to protect the antenna horn against thermal and chemical impact of the tank atmosphere 5. The filling member 20 is preferably made of a chemically resistant and water repellant material, such as a fluoropolymer. In the present example, the polymer material is PTFE (Teflon®), chosen for its temperature resistance.

The filling member 20 here has a cylindrical portion 22 adapted to fit in the waveguide section 16, and a conical portion 23 adapted to fit in the horn section 17. The base 24 of the conical portion, i.e. the surface facing the interior of the tank, may have a convex shape in order to shape the radar beam of emitted waves in a beneficial manner.

In order to seal the antenna cavity 19 from tank atmosphere, the filling member 20 may be provided with an annular flange 25, protruding from where the convex base 24 meets the conical portion 23. The flange 25 is sandwiched between the tank connection 12 and the tank flange 13.

The filling member 20 may further be provided with a groove extending around the periphery of the conical portion 22. The groove is adapted to receive a sealing element 27, such as an O-ring. An O-ring may also be employed to mechanically fixate the filling member 20 in the cavity 19.

The transceiver circuitry 6 is configured to generate and transmit an electromagnetic (microwave) transmit signal $S_T$ and receive an electromagnetic (microwave) return signal $S_R$. The transmit signals $S_T$ are propagated towards the surface 3 of the product 4 by the signal propagation device, in this case the antenna 11. The electromagnetic return signals $S_R$ are caused by a reflection in the surface 3, and are returned by the signal propagation device (antenna 11) and fed back to the transceiver 6. The transceiver circuitry 6 may be one functional unit capable of transmitting and receiving electromagnetic signals, or may be a system comprising separate transmitter and receiver units. The elements of the transceiver circuitry 6 are typically implemented in hardware, and form part of an integrated unit normally referred to as a microwave unit. For simplicity, the transceiver circuitry is referred to as the "transceiver" in the following description.

The processing circuitry 7 may include a combination of analogue processing realized in hardware, and digital processing realized embodied by software modules stored in a memory and executed by an embedded processor. The invention is not restricted to the particular realization, and any implementation found suitable to realize the herein described functionality may be contemplated.

The processing circuitry 7 is configured to determine the distance between a reference position at the top of the tank (such as the passage between the outside and the inside of the tank) and the surface 3 by analyzing the transmit signal $S_T$ and the return signal $S_R$. The processing typically includes generation of a tank signal or "echo curve", including a plurality of peaks representing echoes from the interior of said tank. One of the peaks represent an echo from the surface 3. Based on the determined distance to the surface 3, generally referred to as ullage, and known dimensions of the tank 5, a process variable such as the filling level L of the tank can be deduced.

The interface 8 is configured to allow communication of a measurement value externally of the RLG and optionally for power supply of the RLG. For example, the interface 8 may be a two-wire control loop 9, such as a 4-20 mA loop. The interface 8 may also include a serial data bus, allowing communication using a digital communication protocol. Examples of available digital protocols include HART, Modbus, Profibus and Foundation Fieldbus. The interface 8 may also be a wireless interface, employing e.g. wireless HART, in which case the RLG is provided with some sort of internal energy store, such as a battery 17, possibly solar powered.

The transmit signal is here a high frequency signal, with an operating frequency range greater than 1 GHz. Typically, the operating frequency range is centered around 6 GHz or 26 GHz, with a band-width of one or several GHz.

According to one measuring principle, the transmit signal is a continuous signal with varying frequency (frequency modulated continuous wave, FMCW). An FMCW based RLG will emit a radar sweep with gradually varying frequency, and mix the received signal with the original signal (homodyne mixing) to form a frequency domain tank signal.

According to another measurement principle, the transmit signal is a train of distinct pulses with a duration in the order of ns and a repletion frequency in the order of MHz. The return signal is sampled with the original pulse train in a sample and hold circuit in a process known as time domain reflectometry (TDR), thereby forming a time domain tank signal. When time domain reflectometry is used in a NCR level gauge, the pulses need to be frequency modulated to allow emission with the directional antenna.

The transmit signal may also be some combination of FMCW and a pulsed signal. For example, a principle known as multiple frequency pulsed wave (MFPW) has been proposed.

In case of a frequency domain tank signal, the amplitude of the tank signal is expressed as a function of frequency, where the frequency is related to the distance from the reference position. In case of a time domain tank signal, the amplitude of the tank signal is expressed as a function of time, where the time is related to the distance from the reference position.

Returning to the wave guide filling member 20, three different examples, in accordance with various embodiments of the present invention, are shown in FIGS. 2*a*, 2*b*, 2*c*, 3*a*, 3*b* and 3*c*, and labeled 120, 220 and 320 respectively.

In all three examples, the filling member 120, 220, 320 has been provided with a microwave absorbing element 130, 230, 330. By "microwave absorbing" is here intended a microwave attenuation of at least 1 dB/centimeter at the operating frequency of the radar level gauge. In practical examples, the attenuation may be significantly stronger, e.g. 3 dB/centimeter, or more. This is in contrast with the main body, which typically is specifically designed to have as small microwave attenuation as possible at the operating frequency.

Figure 4:
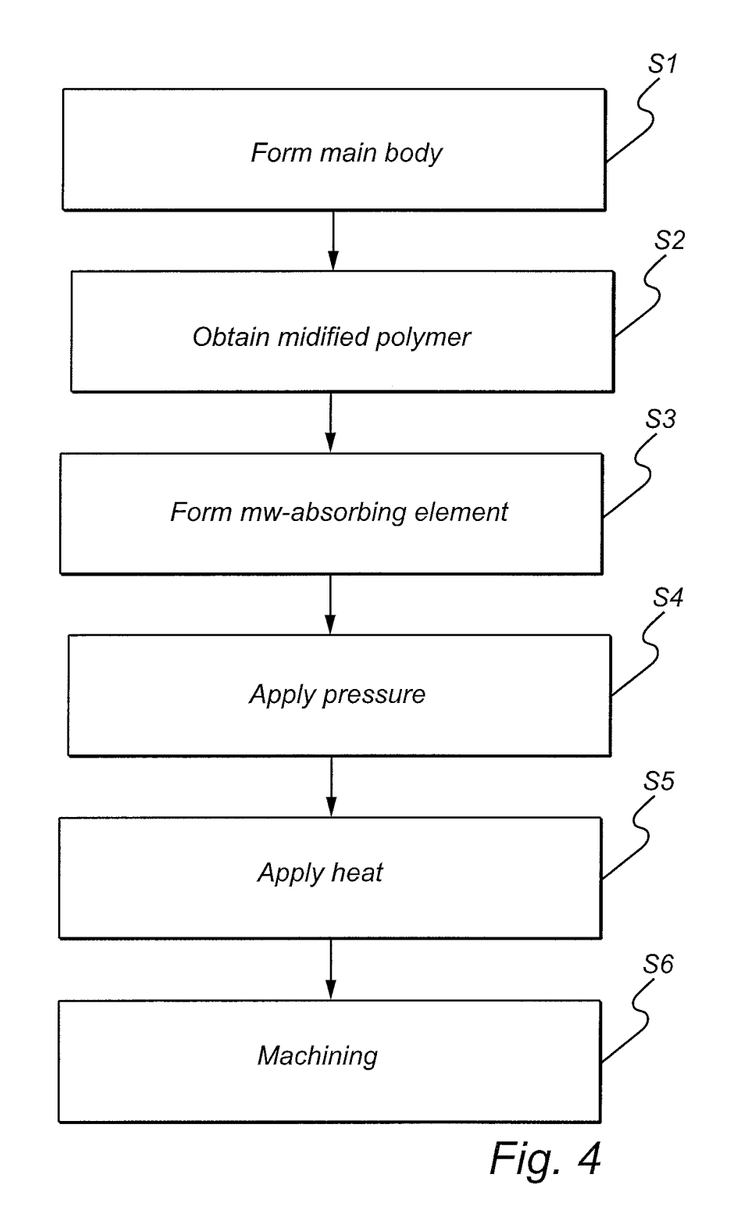
FIG. 4 is a flow chart showing a process according to an embodiment of the present invention.

With reference to FIG. 4, the dielectric filling member 120, 220, 320 is manufactured by the following process.

First, in step S1, a main body 121, 221, 321 is formed of a polymer material having suitable properties, here PTFE. The polymer material may be considered pure, or substantially pure, but may include a certain fraction of a non-polymer material such as glass, in order to provide suitable mechanical properties.

When using PTFE, the main body is typically formed by first forming a blank having an appropriate basic shape by means of compression molding, and then machining this blank to its final shape. Compression molding of PTFE includes filling a PTFE resin (powder) into a die cavity of relatively simple shape, and then compressing the die using a hydraulic press. As mentioned, in order to provide appropriate mechanical properties, the PTFE resin may be mixed with small amounts of particles, such as glass particles. Details of compression molding, as well as other molding processes, are known in the art. The molded (and possibly machined) blank is allowed to rest for up to a few days, in order for any air trapped in the molded blank to escape.

In step S2, which of course may be performed long before step S1, a modified polymer material is obtained by mixing a polymer resin, here PTFE resin, with a filler material, typically in powder form. The filler material is chosen such that the modified polymer material provides increased microwave losses than the substantially pure polymer material, i.e. is more microwave absorbing. The filler material may be electrically conducting, such as carbon or metal. The filler material may alternatively be a magnetic material, such as ferrite. Of course, some materials are electrically conductive as well as magnetic. Also, several different filler materials may be used to obtain suitable microwave absorbing properties. The fraction of filler material will depend on the filler material and the desired properties. Most importantly, the fraction must be large enough to obtain the required microwave attenuation, and small enough to enable sintering. As an example, the fraction of filler material may be in the range 1-5% by weight.

In step S3, the microwave absorbing element 130, 230, 330 is formed of the modified polymer material, here modified PTFE. The element 130, 230, 330 may be formed using a similar technique as that used for forming the main body, e.g. compression molding and appropriate machining. It may also be formed by sintering.

In step S4 pressure is applied by arranging the element 130, 230, 330 in pressurized contact with the main body 121, 221, 321, and in step S5 heat is applied such that the microwave absorbing element 130, 230, 330 is sintered with the main body. As mentioned above, sintering here refers to an integration without melting. Although the steps of applying pressure and temperature are here illustrated as separate steps, it is noted that pressure continues to be applied also in step S5, such that pressure and temperature are applied simultaneously in order to achieve integration by sintering. The sintering cycle—i.e. the sequence of temperatures and durations—may be as long as 10 hours or more, even up to or exceeding 50 hours, depending on the size of the element 130, 230, 330.

After the element 130, 230, 330 has been sintered with the main body, additional machining may be required in step S6 for the dielectric filling member 120, 220, 320 to take on its final shape.

Figure 2A:
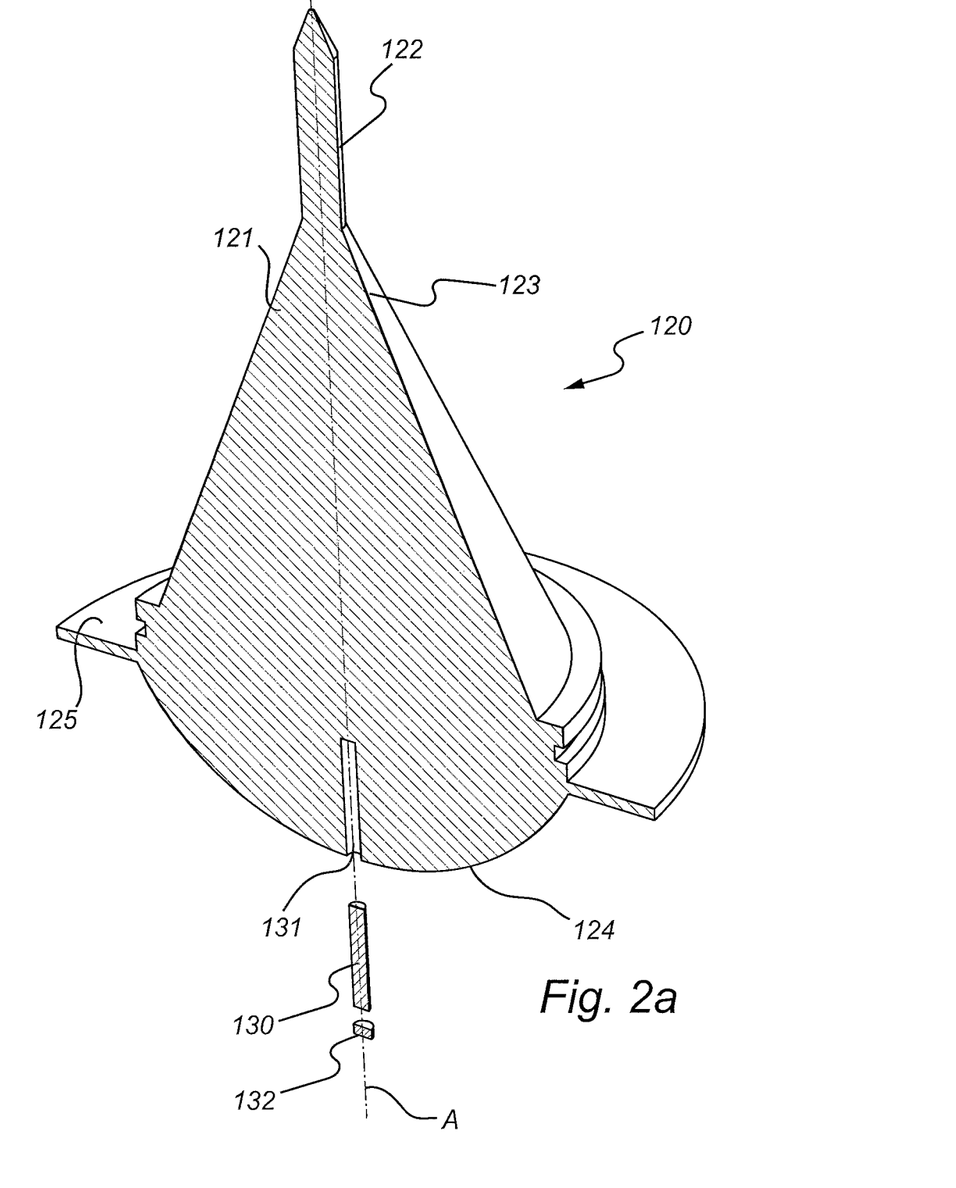
FIGS. 2a, 2b and 2c are perspective, partially sectioned, exploded views of three different examples of dielectric filling members according to embodiments of the present invention.
Figures 3A, 3B, 3C:
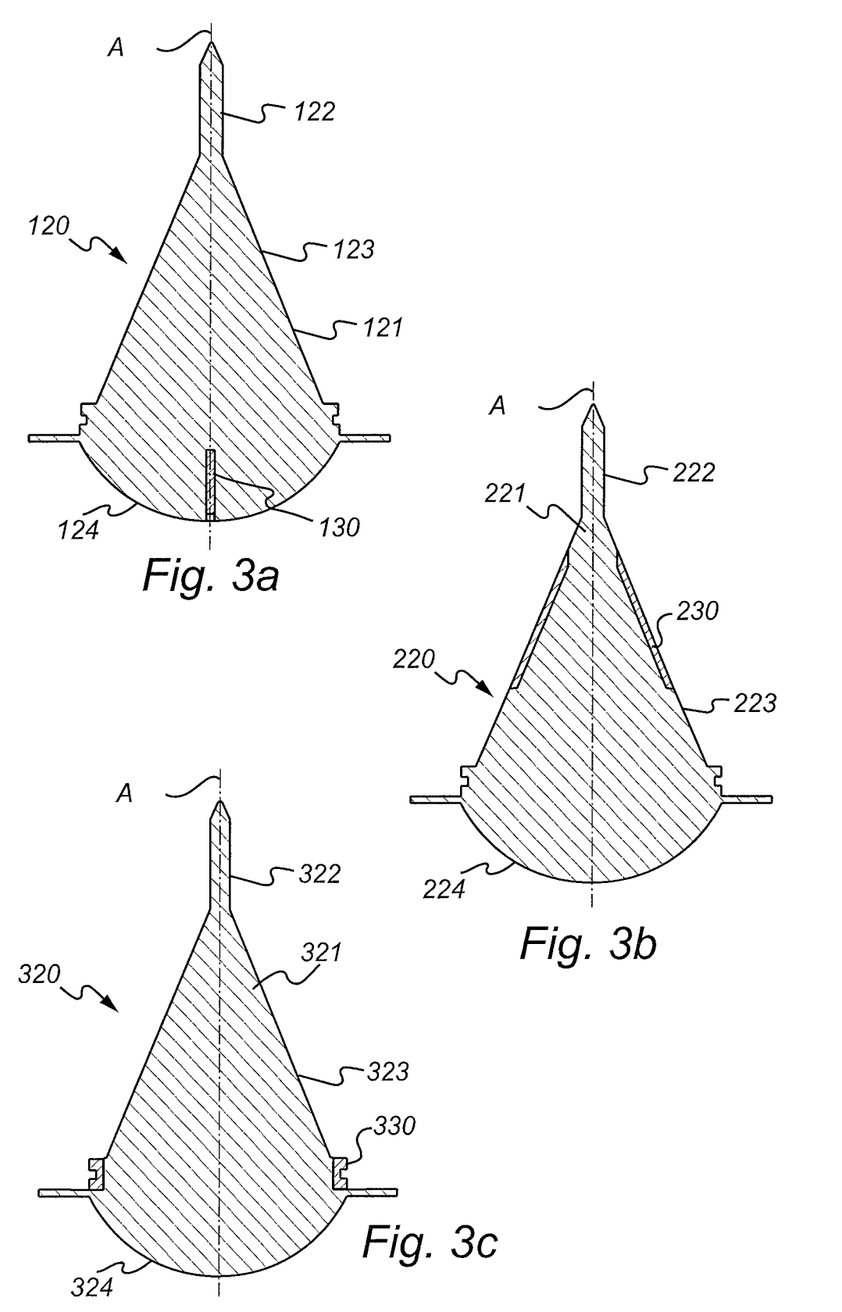
FIGS. 3a, 3b, 3c are plane section views of the filling members in FIGS. 2a, 2b and 2c, respectively.

In FIGS. 2*a* and 3*a*, the dielectric filling member 120 is provided with a microwave absorbing element in the form of a substantially cylindrical pin 130. Alternatively, the pin 130 may be slightly tapered.

Step S4 here involves forming, in the main body 121, a hole 131 for receiving the pin 130. The hole has a diameter which is slightly smaller than the diameter of the pin 130, such that the pin 130 must be pushed into the hole 131 and will be subject to radial pressure from the walls of the hole. Then, a plug 132 made of the same polymer material as the main body 121, and having the same diameter as the pin 130, is also pressed into the hole 131. The pin 130 and the plug 132 are pushed in the axial direction such that pressure is also applied in the axial direction. The pin is thus pressurized in all directions.

Step S5 here involves subjecting the main body 121, the pin 130 and the plug 132 to heat, to an extent that results in integration without melting, also known as sintering. In this process, the pin 130 of modified polymer is sintered to the surrounding polymer, and the plug 132 is also sintered to the rest of the main body 120.

Preferably, the integration of the pin 130 and the main body 121 is done before the filling member 120 is given its final form by suitable machining. After machining, the pin 130 will be embedded in the filling member 120 beneath the convex surface 124 and aligned with the center axis A of the filling member 120.

Figure 2B:
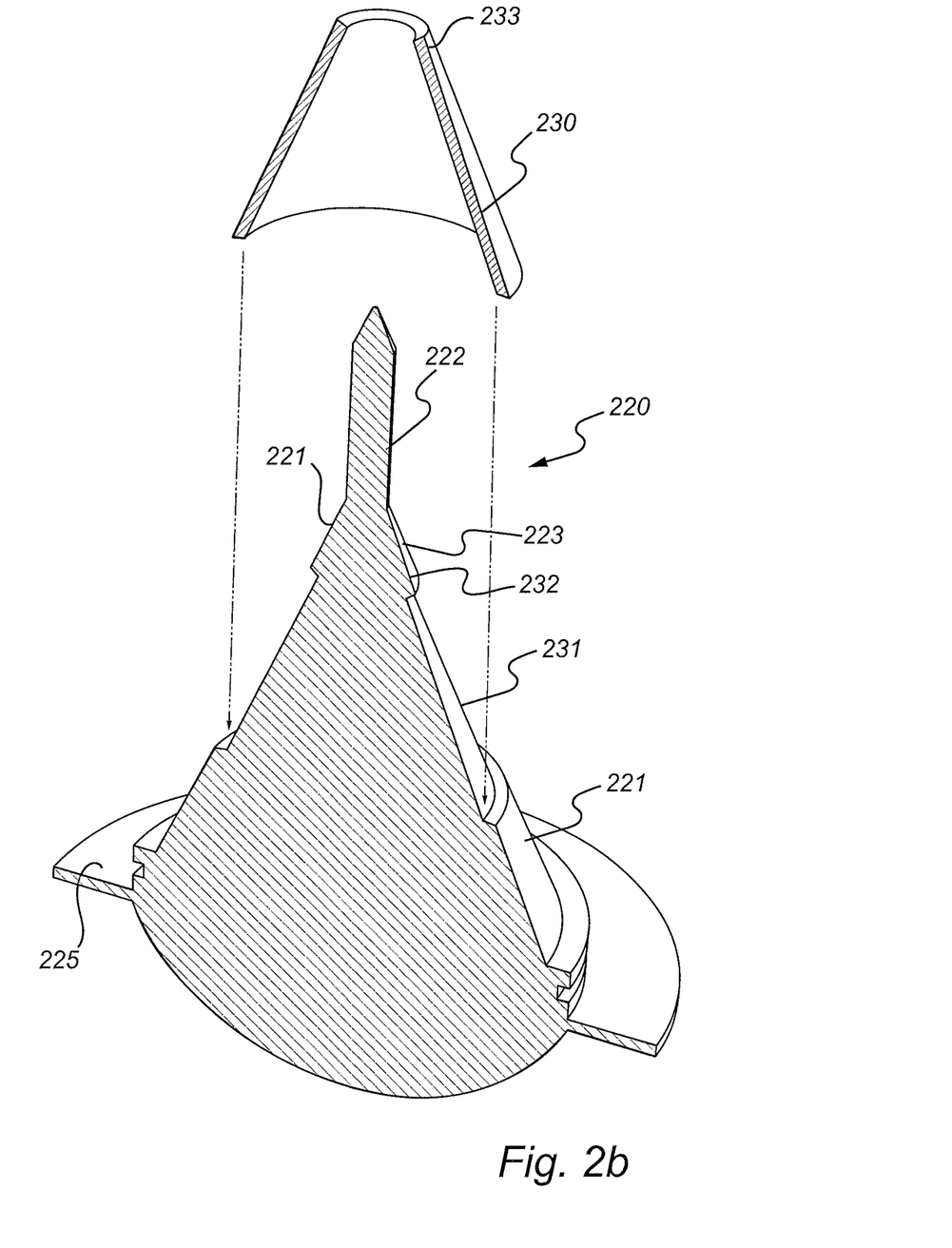

Turning to FIGS. 2b and 3b, the dielectric filling member 220 is here provided with a microwave absorbing element in the form of a tapered sleeve 230.

The conical portion 223 of the main body 220 is here formed in step S1 with an annular indentation or depression 231 for receiving the tapered sleeve 230. The diameter of the indentation 231 is slightly larger than the inner diameter of the sleeve 230, such that the sleeve 230 in step S4 can be pressed into the indentation and will be subject to an outward radial pressure. When the sleeve 230 has been pressed in place, the upper ridge 233 of the indentation, i.e. the smaller diameter ridge, will engage the upper rim 233 of the sleeve 230 and thus serve to hold the sleeve 230 in place.

Step S5 here involves subjecting the main body 221 and the sleeve 230 to heat, to an extent that results in integration without melting, also known as sintering. In this process, the sleeve 230 of modified polymer is sintered to the main body 221 of polymer.

Figure 2C:
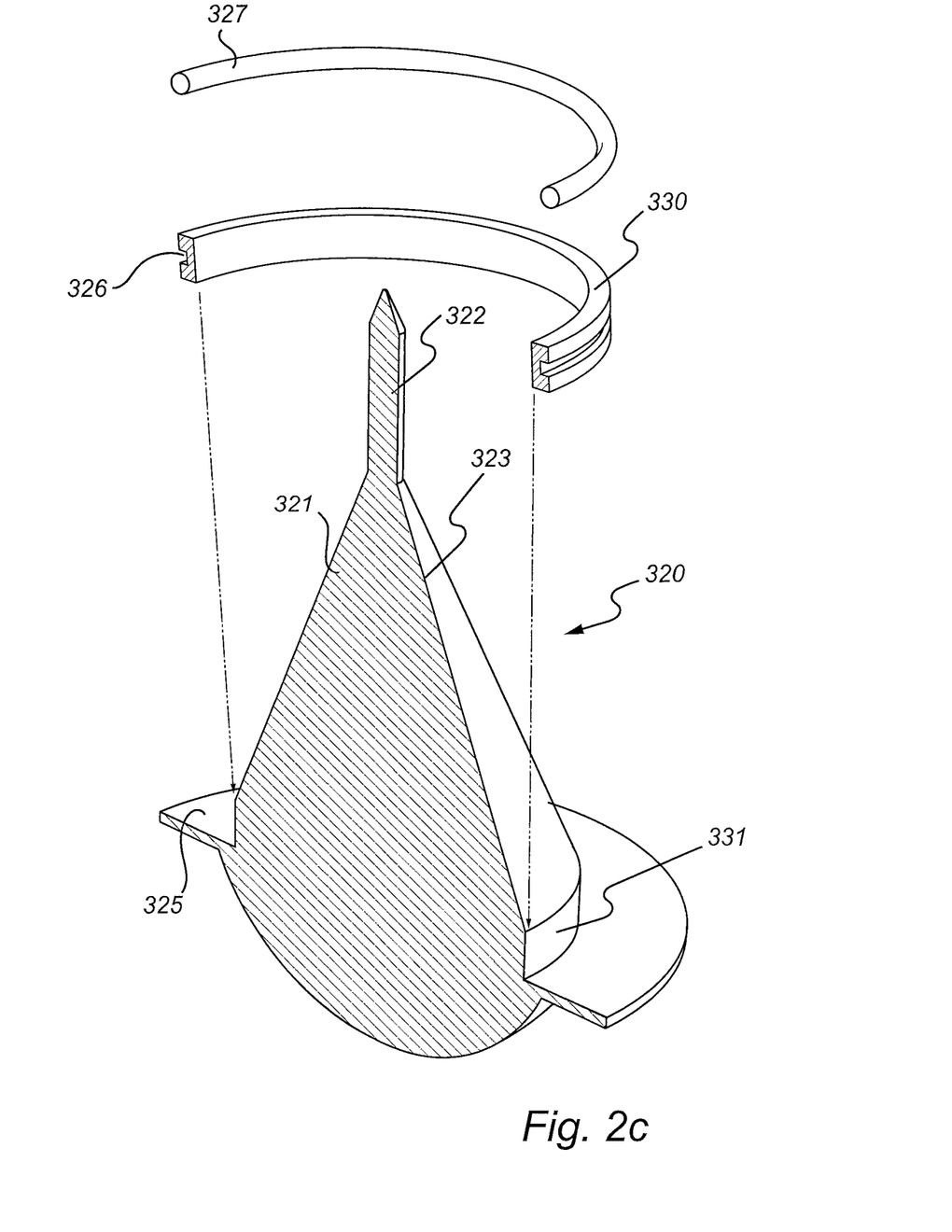

Turning finally to FIGS. 2c and 3c, the dielectric filling member 320 is here provided with a microwave absorbing element in the form of a annular element 330, formed with a groove 326 along its outer periphery, which groove is adapted to receive a sealing element 327, here an O-ring. When the filling member 320 is arranged in the horn antenna, the O-ring will provide a sealing between the inside of the horn and the dielectric member.

The main body 321 is here formed with a substantially cylindrical portion 331 immediately adjacent the radial flange 325 for receiving the annular element 330. The diameter of the portion 331 is slightly larger than the inner diameter of the annular element 330, such that the element 330 in step S4 can be pressed onto the cylindrical portion 331 and will be subject to an outward radial pressure.

Step S5 here involves subjecting the main body 321 and the annular element 330 to heat, to an extent that results in integration without melting, also known as sintering. In this process, the sleeve 330 of modified polymer is sintered to the main body 321 of polymer.

It is noted that an annular groove-forming element 330 may have other dimensions, and be adapted to be sintered to another portion of the main body. For example, it may be beneficial to provide an annular groove for fitting a sealing element closer to the top of the conical portion, or even along the cylindrical portion. A grove formed by this process will be essentially invisible to microwaves propagating through the cavity of the wave guiding structure, due to the microwave absorbing character of the element 330.

It is noted that the filling members 120, 220 and 320 may be implemented separately, to provide significant and completely distinct advantages to a radar level gauge. However, it is also noted that features of the filling members 120, 220 and 320 may be combined in any possible way. For example, a filling member may be provided both with an absorbing pin according to FIG. 2a and an absorbing sleeve according to FIG. 2b, etc.

The person skilled in the art realizes that the present invention by no means is limited to the preferred embodiments described above. On the contrary, many modifications and variations are possible within the scope of the appended claims. For example, the shape and proportions of the dielectric filling member may be different, depending on the shape and proportions of the antenna cavity. In particular, the horn section may be smaller, resulting in a relatively longer waveguide section, which affects the shape of the filling member. Further, as mentioned above, the invention may also be implemented in a radar level gauge without any antenna horn.

What is claimed is:

1. A radar level gauge, for determining a process variable of a product in a tank using electromagnetic measuring signals, comprising:
   a signal propagation device adapted to direct a microwave transmit signal toward said product and return reflections thereof from a surface of said product,
   said signal propagation device including a wave guiding structure and a cavity formed inside said wave guiding structure; and
   a dielectric filling member arranged at least partly within said cavity, said dielectric filling member including:
   a main body formed of a polymer material,
   at least one microwave absorbing element formed of a modified polymer material providing a microwave attenuation of at least 1 dB/centimeter at an operating frequency of the radar level gauge, said modified polymer material being obtained by modifying said polymer material with a filler material,
   wherein said at least one microwave absorbing element is integrally formed with said main body by sintering,
   wherein said at least one microwave absorbing element is embedded in the main body, and serves to reduce resonance in microwave signals in the wave guiding structure.

2. The radar level gauge according to claim 1, wherein said polymer material is a fluoropolymer, preferably PTFE.

3. The radar level gauge according to claim 1, wherein said filler material is one of a conductive material such as carbon or metal, and a magnetic material such as ferrite.

4. The radar level gauge according to claim 1, wherein said filler material constitutes less than 15% by weight of the modified polymer material, and preferably less than 10% by weight of the modified polymer material.

5. The radar level gauge according to claim 1, wherein said filler material constitutes at least 0.5% by weight of the modified polymer material, and preferably at least 1% by weight of the modified polymer material.

6. The radar level gauge according to claim 1, wherein said wave guiding structure includes a horn antenna having a waveguide section and a horn section, said cavity being formed inside said waveguide section and said horn section.

7. The radar level gauge according to claim 6, wherein said main body has a substantially cylindrical portion filling said waveguide section, a substantially conical portion filling said horn section, and a convex end portion extending beyond an opening of the horn section.

8. The radar level gauge according to claim 7, wherein said main body further includes an annular flange for providing sealing between a tank connection of the radar level gauge and a tank flange on which the radar level gauge is intended to be mounted.

9. The radar level gauge according to claim 7, wherein said at least one microwave absorbing element is a pin embedded beneath an outer surface of said convex end portion.

10. The radar level gauge according to claim 1, further comprising:
   transceiver circuitry electrically connected to said signal propagation device and configured to generate and transmit an electromagnetic transmit signal $S_T$ and receive an electromagnetic return signal reflected from the tank, processing circuitry configured to determine the distance between a reference position and the surface of the product based on a relationship between the transmit signal and the return signal, and an interface configured to communicate measurement data.

11. A method for manufacturing a dielectric filling member for a wave guiding structure of a radar level gauge, including the steps:

forming a main body of a polymer material, obtaining a modified polymer material by modifying said polymer material with a filler material, said modified polymer material providing a microwave attenuation of at least 1 dB/centimeter at an operating frequency of the radar level gauge, forming at least one microwave absorbing element of said modified polymer material, arranging said at least one microwave absorbing element in pressurized contact with said main body, and heating said main body and said at least one microwave absorbing element to such an extent that said at least one microwave absorbing element is sintered with said main body, wherein the step of arranging said at least one microwave absorbing element in pressurized contact with said main body includes embedding said at least one microwave absorbing element in said main body, in order to reduce resonance in microwave signals in the wave guiding structure.

12. The method according to claim 11, wherein said polymer material is a fluoropolymer such as PTFE.

13. The method according to claim 11, wherein said filler material is one of a conductive material such as carbon or metal, and a magnetic material such as ferrite.

14. The method according to claim 11, wherein said filler material constitutes less than 15% by weight of the modified polymer material, and preferably less than 10% by weight of the modified polymer material.

15. The method according to claim 11, wherein said filler material constitutes at least 0.5% by weight of the modified polymer material, and preferably at least 1% by weight of the modified polymer material.

16. The method according to claim 11, wherein said main body is formed to have a substantially cylindrical portion for filling a waveguide section of wave guiding structure, a substantially conical portion for filling a horn section of said wave guiding structure, and a convex end portion intended to extend beyond an opening of the horn section.

17. The method according to claim 16, wherein said main body is formed to have an annular flange for providing sealing between a tank connection of the radar level gauge and a tank flange on which the radar level gauge is intended to be mounted.

18. The method according to claim 16, further comprising:

forming a hole in the main body extending from an outer surface of said convex end portion, forming said at least one microwave absorbing element as a pin, having a shape adapted to fit tightly in said hole, pressing said pin into said hole, forming a plug of the polymer material, said plug having a shape to fit tightly in said hole, pressing said plug into said hole to cover the pin, so that, when said main body and said pin are integrated by sintering, said pin is completely concealed in said main body.

19. The method according to claim 18, further comprising machining the dielectric filling member subsequent to the sintering step.

20. The method according to claim 18, wherein the pin is one of substantially cylindrical and tapered.

* * * * *